(12) United States Patent
Agrawal

(10) Patent No.: US 8,959,346 B2
(45) Date of Patent: *Feb. 17, 2015

(54) SYSTEM AND METHOD FOR A SINGLE REQUEST—SINGLE RESPONSE PROTOCOL WITH MUTUAL REPLAY ATTACK PROTECTION

(71) Applicant: Adobe Systems Incorporated, San Jose, CA (US)

(72) Inventor: Sunil C. Agrawal, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 13/754,098

(22) Filed: Jan. 30, 2013

(65) Prior Publication Data

US 2013/0151857 A1 Jun. 13, 2013

Related U.S. Application Data

(63) Continuation of application No. 12/431,598, filed on Apr. 28, 2009, now Pat. No. 8,392,709.

(51) Int. Cl.
*H04L 29/06* (2006.01)
*H04L 9/32* (2006.01)

(52) U.S. Cl.
CPC ............ *H04L 9/3247* (2013.01); *H04L 9/3228* (2013.01); *H04L 9/3297* (2013.01); *H04L 63/126* (2013.01); *H04L 2463/121* (2013.01)
USPC ............ 713/169; 713/176; 713/178; 713/179

(58) Field of Classification Search
CPC ........ H04L 9/32; H04L 9/3228; H04L 9/3247
USPC ................... 713/169, 176, 178, 179
See application file for complete search history.

(56) References Cited

U.S. PATENT DOCUMENTS

| 6,496,824 | B1 | 12/2002 | Wilf |
| 6,665,530 | B1 | 12/2003 | Broyles et al. |
| 7,353,380 | B2 | 4/2008 | VanHeyningen |

(Continued)

OTHER PUBLICATIONS

"Final Office Action", U.S. Appl. No. 12/431,598, (Jun. 19, 2012), 22 pages.
"Non-Final Office Action", U.S. Appl. No. 12/431,598, (Jan. 30, 2012), 19 pages.
"Notice of Allowance", U.S. Appl. No. 12/431,598, (Dec. 4, 2012), 9 pages.

(Continued)

*Primary Examiner* — Kaveh Abrishamkar
*Assistant Examiner* — Ngoc D Nguyen
(74) *Attorney, Agent, or Firm* — Wolfe-SBMC

(57) ABSTRACT

Various embodiments of a system and method for a single request-single response protocol with mutual replay attack protection are described. Embodiments include a system that receives multiple single request messages, each of which include a respective nonce, timestamp, and digital signature. The system may create a record of previously received nonces that, at any given time, may include multiple message nonces received within a valid period of time prior to that given time. To validate a given single request message, the system verifies the digital signature of the message, determines that the timestamp of the message indicates a time within the valid period of time prior to the current time, and determines that the nonce of the message is not present within the record of previously received nonces. The system sends a single response message that includes the same nonce as the validated message.

20 Claims, 5 Drawing Sheets

(56) References Cited

U.S. PATENT DOCUMENTS

| | | |
|---|---|---|
| 8,392,709 B1 | 3/2013 | Agrawal |
| 2003/0067921 A1 | 4/2003 | Sivalingham |
| 2003/0069967 A1* | 4/2003 | Vincent .................. 709/225 |
| 2003/0149880 A1 | 8/2003 | Shamsaasef et al. |
| 2005/0044354 A1 | 2/2005 | Hagerman |
| 2005/0050364 A1 | 3/2005 | Feng |
| 2006/0129488 A1 | 6/2006 | Vincent |
| 2006/0190723 A1 | 8/2006 | Benson |
| 2006/0259969 A1 | 11/2006 | Suh et al. |
| 2009/0013177 A1 | 1/2009 | Lee et al. |
| 2009/0265556 A1 | 10/2009 | Lee |
| 2009/0282256 A1 | 11/2009 | Rakic et al. |

OTHER PUBLICATIONS

Altaf, et al., "Secutiy Enhancements for Privacy and Key Management Protocol in IEEE 802.16e-2005", *IEEE 2008, Ninth ACIS International Conference on Software Engineering, Artificial Intelligence, Networking, and Parallel/ Distributed Computing.*, (2008), 5 pages.

Sanzgiri, et al., "A Secure Routing Protocol for Ad Hoc Networks", *IEEE 2000, Proceedings of the 10th IEEE International Conference on Network Protocols (ICNP '02).*, (2000), 10 pages.

Xie, et al., "A Framework for Integrated Internet and Ad hoc Network Security", Bin Xie, et al., "*A framework for integrated Internet and ad hoc network security*,", 7 pages.

\* cited by examiner

SYSTEM AND METHOD FOR A SINGLE REQUEST—SINGLE RESPONSE PROTOCOL WITH MUTUAL REPLAY ATTACK PROTECTION

RELATED APPLICATIONS

This is a continuation of, and claims priority to, U.S. patent application Ser. No. 12/431,598, filed on Apr. 28, 2009, the entire disclosure of which is incorporated by reference herein.

BACKGROUND

1. Field of the Invention

The present invention is directed to computer systems. More particularly, it is directed to providing protection from mutual replay attacks in computing environments.

2. Description of the Related Art

The Internet, sometimes called simply "the Net," is a worldwide system of computer networks in which a client at any one computer may, with permission, obtain information from any other computer. The most widely used part of the Internet is the World Wide Web, often abbreviated "WWW," which is commonly referred to as "the web." The web may be defined as all the resources (e.g., web pages and web sites) and users on the Internet that use the Hypertext Transfer Protocol (HTTP) or variations thereof to access the resources. A web site is a related collection of web files that includes a beginning file called a home page. From the home page, the user may navigate to other web pages on the web site. A web server program is a program that, using the client/server model and HTTP, serves the files that form the web pages of a web site to the web users, whose computers contain HTTP client programs (e.g., web browsers) that forward requests and display responses. A web server program may host one or more web sites.

The ubiquitous nature of the Internet and other electronic communication channels has led to a rise in electronic commerce and other electronic activities for which security is a concern. To breach security of such communication channels, attackers and other unscrupulous individuals employ a variety of techniques aimed at weak points in communication protocols. One common type of attack includes the replay attack. In one example of replay attack, an attacker might eavesdrop on messages communicated between a first entity and a second entity and leverage information gained through eavesdropping in order to pose as a legitimate party to the communication. For instance, the attacker might eavesdrop on a message including authentication information (e.g., a password) sent by the first entity to the second entity as proof of identity. With knowledge of the information gained through eavesdropping, the attacker may pose as the first entity by sending a message that includes the eavesdropped authentication information.

SUMMARY

Various embodiments of a system and method for a single request-single response protocol with mutual replay attack protection are described. Embodiments may include a system (e.g., a server computer system) configured to receive multiple single request messages, each of which may include a respective nonce, a timestamp based on a time at which that single request message was generated, and a digital signature of that single request message. Such single request messages may each be sent by a respective client system.

The system may be further configured to create a record of previously received nonces (which may be used for validating received messages). At any given time, the record may include multiple message nonces received within a valid period of time prior to that given time. To validate a given single request message, the system may be configured to verify the digital signature of the that message, determine that the timestamp of that message indicates a time that is within the valid period of time prior to the current time, and determine that the nonce of the that message is not present within the record of previously received nonces at the current time. In various cases, this validation process may ensure that a single request message cannot be replayed by an attacker to compromise the security of the system.

In response to validating the given single request message, the system may be configured to send a single response message that includes the same nonce of the validated message as well as information associated with the fulfillment of the given single request message.

In various embodiments, the single response message may be sent to the system that sent the corresponding single request message (e.g., a corresponding client computer system), which may be referred to as the client. The client may perform a validation process on the single response message, which may include determining that the nonce of the response message matches the nonce of the corresponding request message sent by the client. In various cases, this validation process may ensure that a single response message cannot be replayed by an attacker to compromise the security of the system. In this way, various embodiments may provide mutual replay attack prevention by protecting both server computer systems and client computer systems from replay attacks.

BRIEF DESCRIPTION THE DRAWINGS

Figure 1:
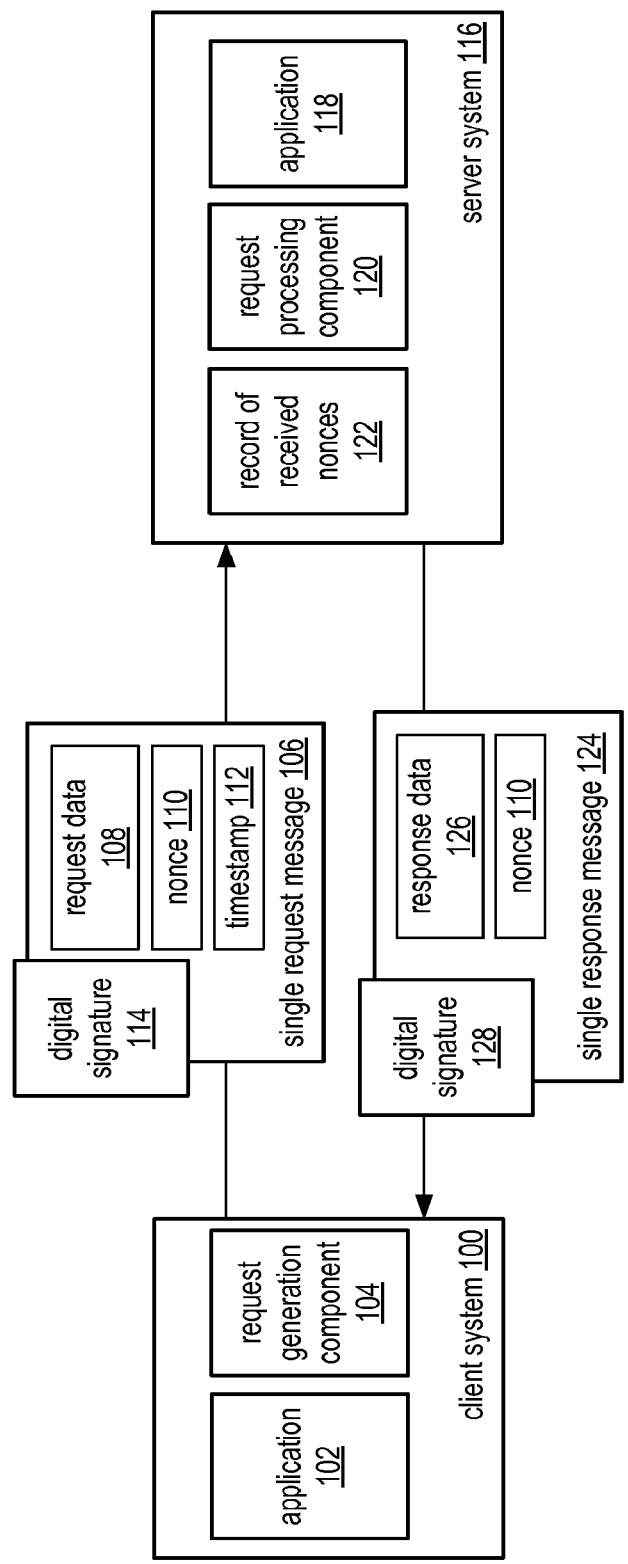
FIG. 1 illustrates a data flow diagram of a process for performing a single request-single response protocol with mutual replay attack protection, according to various embodiments.

While the system and method for a single request-single response protocol with mutual replay attack protection is described herein by way of example for several embodiments and illustrative drawings, those skilled in the art will recognize that the system and method for a single request-single response protocol with mutual replay attack protection is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for a single request-single response protocol with mutual replay attack protection as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. In various portions of the description presented herein, the terms "validate", "verify", "validation", "verification", "validating", and "verifying" may be used interchangeably.

DETAILED DESCRIPTION OF EMBODIMENTS

Various embodiments of a system and method for a single request-single response protocol with mutual replay attack protection are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Note that the description presented herein may include one or more references to a cryptographic hash function, or simply hash function. In various embodiments, the hash functions described herein may be any of various hash functions including, but not limited to, the Secure Hash Algorithm (SHA) (e.g., SHA-1, SHA-0, SHA-224, SHA-256, SHA-384, SHA-512, and other SHA variations), the RACE Integrity Primitives Evaluation Message Digest (RIPEMD) (e.g., RIPEMD-128, RIPMED-160, RIPEMD-256, RIPEMD-320, and other RIPEMD variations), the Message Digest algorithm (MD) (e.g., MD-3, MD-4, MD-5, and other MD variations), the Tiger and Tiger2 hash functions (e.g., Tiger-128, Tiger-160, Tiger-192, Tiger2-128, Tiger2-160, Tiger2-192, and other Tiger variations), the Very Efficient Substitution Transposition (VEST) (e.g., VEST-4, VEST-8, VEST-16, VEST-32, and other VEST variations), the WHIRLPOOL hash function, some other hash function whether presently known or developed in the future, and/or some combination or variation of any of the aforesaid hash functions.

Introduction

Figure 5:
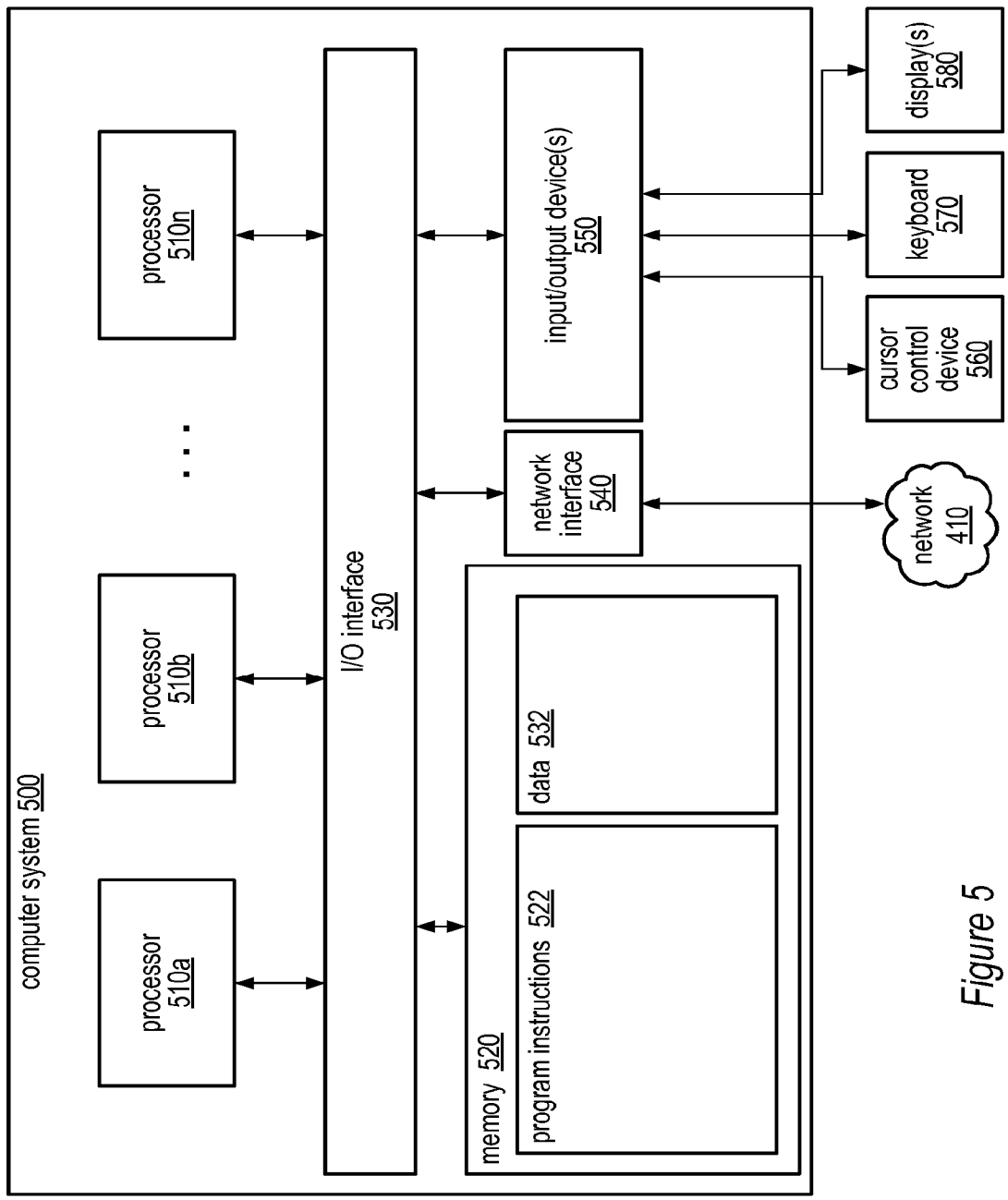
FIG. 5 illustrates an example computer system configured to implement various elements of the system and method for a single request-single response protocol with mutual replay attack protection, according to various embodiments.

FIG. 1 illustrates a logical representation of various components in one embodiment of the system and method for a single request-single response protocol with mutual replay attack protection. Note that in various embodiments, client system 100 and server system 116 may each be implemented by one or more computer systems, such as the host system described below with respect to FIG. 5. As illustrated, each of client system 100 and server system 116 may communicate with the other according to a secure communication protocol providing mutual replay attack protection. For instance, instead of only providing protection for one of the client system and the server system, the secure communication protocol may provide replay attack protection for both the client system 100 and server system 116. In various embodiments, this protocol may include only a single request and single response for a given request (referred to herein as a "single request-single response protocol"). In addition to providing mutual replay protection, the single request-single response protocol of various embodiments may simplify logic for handling requests, reduce bandwidth requirements, and simplify load-balancing requirements (described in more detail below). The system and method for a single request-single response protocol with mutual replay attack protection may also be configured to enable communication between clients and servers utilizing unsynchronized time sources.

Mutual Replay Protection

As illustrated, client system 100 may in various embodiments include an application 102 and a request generation component 104. In some cases, request generation component 104 may be a component of application 102 (e.g., an integrated component, plug-in or application extension). In other cases, request generation component 104 may be a stand-alone component (e.g., a stand-alone application) that is configured to communicate with application 102 and is separate from application 102. Application 102 may represent any application configured to submit requests to other entities. In one example, application 102 may be an application that requires a content license, such as a license to access content for a specified period of time. Such licenses may in some cases be part of a digital rights management ("DRM") scheme. For instance, application 102 might represent an electronic book ("e-book") reader configured to submit requests for a license to access (e.g., view, print, copy, etc.) an e-book (e.g., an e-book downloaded from a content source). In another example, application 102 might be an application configured to play music subject to DRM (e.g., a media player application). In that case, application 102 may, prior to playing the music, request an appropriate license by submitting a request to a server configured to provide licenses. In any of the aforesaid examples, application 102 may submit such requests via request generation component 104. For instance, request generation component might provide an application programming interface (API) for computer-executable logic that may be called by application 102 in order to submit a request.

In various embodiments, request generation component may be configured to submit and receive requests according to a single request-single response protocol that provides mutual replay protection. In response to determining that a request is to be submitted (e.g., a request for the licenses described above, a request for permission to perform an action, or some other request), request generation component 104 may generate a single request message 106 that is associated with that single request. Single request message 106 may include request data 108, which may be data describing or identifying the request. For instance, in one embodiments, request data 108 may identify content (e.g., an e-book, music, video, or other media) for which a license is requested. In another example, request data 108 may specify one or more actions for which application 102 seeks permission to perform (e.g., providing a user with access to one or more features of application 102). In some embodiments, request data 108 may include information about the client system and/or application that is submitting the request. For instance, request data 108 may include a host address (e.g., internet protocol address) of client system 100 or an identifier associated with the particular instance of application 102 installed on client system 100. In some cases, request data 108 may include information for identifying or authenticating a user utilizing application 102. For instance, such information may include a username (or other identifier) and/or password for an individual seeking to view an e-book or media file via application 102. In some embodiments, request data 108 may be optional. For example, in some cases, the illustrated system may be configured such that the messages are known by the participating systems to be associated with only one type of request (thereby removing the need to specify such information in each message).

Request generation component 104 may also be configured to generate single request message 106 such that the message includes a nonce 110. In some cases, nonce 110 may represent a session identifier that may be used only once per session. As used herein, the term "session" may refer to a single request-single response session. One example of such a session includes only one request message (e.g., single request message 106) and one response message 124 (single response message 124). Nonce 110 may in various embodiments be a nonce generated randomly or pseudo-randomly. In some cases, nonce 110 may be a cryptographic nonce. One example of a cryptographic nonce includes a nonce generated via a cryptographic hash function. For instance, request generation component 104 may be configured to generate an identifier (e.g., a random or pseudo-random number) and use that identifier as the input to a cryptographic hash function. In some cases, the result of performing that cryptographic hash function may be nonce 110.

Figure 3:
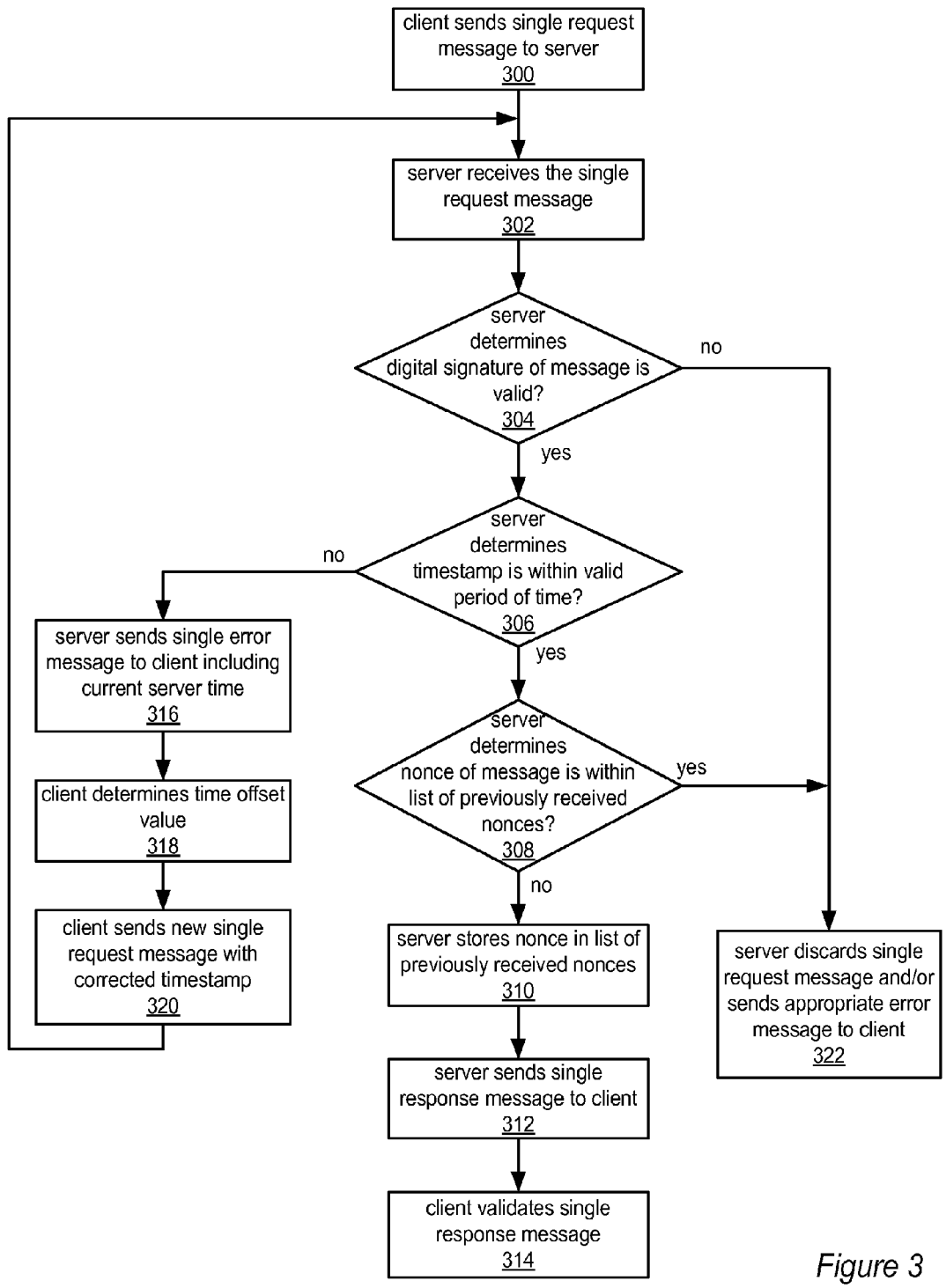
FIG. 3 illustrates a flowchart of an exemplary method that may be implemented by client and server systems, according to various embodiments.

In some embodiments, request generation component 104 may be configured such that a given nonce is only used for one session. For instance, in some cases, the request generation component 104 may be configured to store a list of previously used nonces. The request generation component may be configured to ensure (e.g., via comparison of nonces) that a candidate nonce to be included in a single request message 106 is not present within such list of previously used nonces. In some cases, the request generation component may purge the list of nonces that are older than a particular period of time such that the list does not grow indefinitely and such that nonces may be used more than once over longer periods of time. In other cases, the request generation component may not maintain such a list. For instance, in various embodiments, the request generation component may instead rely on request processing component 120 to ensure that a nonce 110 has not been previously used at all or has not been previously used within a particular time period (described in more detail below with respect to request processing component 120 as well as the flowchart of FIG. 3).

Request generation component 104 may be configured to generate single request message 106 such that it includes a timestamp 112, as illustrated. In various embodiments, timestamp 112 may indicate a time at which the single request message 106 was generated. In some embodiments, timestamp 112 may indicate a time that is the summation of the time at which the single request message was generated and an offset value. Such time offset value may be used to compensate for differences between the respective time sources (e.g., system clocks) utilized by request generation component 104 and request processing component 120. The manner in which some embodiments utilize such a time offset value is described in more detail below with respect to FIG. 2. In various embodiments, request generation component 104 may be configured to obtain a time value for timestamp 112 from a variety of sources including but not limited to the system clock of client system 100, a system clock of another device, or an external time server.

In various embodiments, request generation component 104 may be configured to digitally sign single request message 106 by appending a digital signature 114 to single request message 106. In one example, digital signature 114 may be stored as metadata of single request message 106. To generate digital signature 114, the signature generation component 104 may be configured to perform a cryptographic hash function on single request message 106 which includes request data 108, nonce 110 and timestamp 112 as described above. The result of such operation may be a cryptographic hash of message 106. The request generation component 104 may be configured to perform an asymmetric encryption function on that hash to generate a digital signature. In various embodiments, performing an asymmetric encryption function the hash of message 106 may include encrypting the hash with a private key (e.g., a secret key) associated with the request generation component. The result of this encryption process may include digital signature 114, which may be validated with a public key that forms a private key-public key pair with the aforesaid private key. In various embodiments, such a public key may be distributed to other systems (e.g., server system 116) within a digital certificate, such as an X.509 certificate in Public Key Infrastructure (PKI) systems. As demonstrated by the illustrated embodiment, the signature generation component may be configured to attach or append the generated digital signature 112 to single request message 106 (e.g., by attaching the digital signature as metadata). As illustrated in FIG. 1, the request generation component 104 may be configured to provide the signed data (e.g., single request message 106 including digital signature 114) to server system 116. For instance, such communication may be performed over one or more networks, such as network 410 described below with respect to FIG. 4. In other embodiments, the request generation component 104 may be configured to provide the signed data to one or more intermediary systems (e.g., computer systems, data stores, etc.). In such embodiments, server system 116 may be configured to receive the signed single request message 106 from such intermediary systems.

Request processing component 120 of server system 116 may be configured to validate and process one or more incoming request messages, such as single request message 106. In some embodiments, request processing component 120 may validate a received request message and share the processing of the associated request (e.g., the request specified by request data 108) with one or more applications, such as application 118. For instance, request data 108 might indicate that a particular license (e.g., a license for content, such as e-books or other media) is requested. In this example, request processing component 120 may determine whether the received message is valid and, if valid, rely on application 118 to handle the retrieval of the appropriate license. Note that this is just one example of how request processing component 120 and application 118 may be configured. In other embodiments, request processing component 120 may be mostly or fully responsible for both the validation and processing of received requests.

As described above, request processing component 120 may be configured to determine whether a received single request message is valid. To determine whether single request message 106 is valid, request processing component 120 may be configured to determine whether the digital signature 114 of the message is valid. The process for verifying digital signature 112 may include verifying the digital signature against a public key for client system 100 (or the public key of an entity controlling client system 100). For instance, as described above, the public keys associated with client system 100 may be distributed to server system 116 within a certificate (e.g., an X.509 certificate in PKI). The request processing component 120 may begin this portion of the process of verifying the digital signature by parsing the received message into digital signature 114 and single request message 106. (In some cases, message 106 and digital signature 114 may already be separate and parsing may not be necessary.) The request processing component may perform a hash function (e.g., SHA-1) on single request message 106 to generate a hash result. In various embodiments, the request processing component 120 may utilize the same hash function as utilized by the request generation component as described above. The request processing component may also be configured to perform an asymmetrical decryption function on digital signature 114 by decrypting the digital signature 114 with the public key described above. In various embodiments, public key may be the public key that corresponds to the private key used to generate the digital signature (e.g., the private key and public key may be generated as a key pair by a key derivation function). In various embodiments, the asymmetric decryption function performed by the request processing component 120 may correspond to (and/or be the same as) the asymmetric encryption function performed by the request generation component 104 as described above. The request processing component 120 may be configured to compare hash of single request message 106 with the result of the asymmetric decryption function to determine whether the hash and the decryption result are equivalent to each other (e.g., determine whether they are bit-wise equivalents). If they are equivalent, request processing component 120 may determine that the digital signature is valid and may proceed with validating the single request message. If they are not equivalent, request processing component 120 may determine that the digital signature is not valid and may discard the single request message.

In addition to determining whether digital signature 114 is valid, the request processing component 120 may also be configured to determine whether the timestamp of the single request message indicates a time within a valid period of time from the current time. In one example, a valid time period might include a range of time extending from particular time before the current time up to the current time (e.g., the last minutes or some other time window). Note that the valid period of time may be configurable in various embodiments (e.g., configurable by a system administrator). By ensuring that the timestamp of the single request message indicates a time that falls within the valid period of time, the request processing component 120 may in some cases prevent replay attacks where an attacker tries to submit a replayed message at some time in the future. Single request messages having timestamps that indicate a time that falls outside of the valid period of time may be referred to herein as expired single request messages.

In addition to determining that the single request message has not expired, request processing component 120 may be configured to determine that nonce 110 of the message is not present within the record of received nonces 112. Record of received nonces 112 may be a record managed by request processing component 120. In various embodiments, each time a single request message is received, request processing component 120 may store the nonce of that request with the record of received nonces 122. Further note that the request processing component 120 may be configured to create the record of received nonces 122 such that the record only includes nonces for messages received during the valid period of time with respect to the current time (e.g., a valid period of time prior to the current time). As described above, this period of time may be a rolling window of time (e.g., 5 minutes or some other period of time). By creating the record of received nonces in this manner, request processing component 120 may prevent the record of received nonces from growing indefinitely and thus conserve storage requirements for the record of received nonces. As part of the validation process for the single request message, request processing component 120 may be configured to ensure that the nonce of the received message is not already present within the record of received nonces 122. If the nonce is determined to already be present within the record of nonces, the request processing component may not validate the single request message. By operating in this manner, request processing component 120 may ensure that replayed messages are determined to be invalid (e.g., since replayed messages may include replayed nonces).

Note that even in embodiments where the record of received nonces 122 only includes nonces received within a valid period of time with respect to the current time, the validation process performed by the request processing component 120 may not present a security concern. For instance, since the request processing component 120 may be configured to invalidate messages that are expired (e.g., messages having a timestamp that indicates a time at falling outside of the valid time window with respect to the current time), there may in various embodiments be no need for the request processing component to maintain records of nonces received prior to the valid period of time.

If the request processing component 120 determines that digital signature 114 is valid (e.g., valid based on the appropriate public key), the timestamp 112 indicates that the time at which the single request message was generated falls within the valid period of time (e.g., a valid window of time with respect to the current time), and that nonce 110 is not present with the record of received nonces 122, the request processing component 120 may determine that the single request message 106 is a valid single request message. In various embodiments, if any of such conditions are not met, request processing component 120 may determine that the single request message is invalid and refrain from processing the single request message. One particular example of this is illustrated with respect to FIG. 2, which is described in more detail further below.

In response to determining that the single request message is valid, request processing component 120 may process the single request message in order to fulfill the associated request. To process single request message 106, the request processing component 120 may be configured to store the nonce 110 within the record of received nonces 122. In this way, request processing component may prevent a replay attack that submits a message including the same nonce at a time falling within the valid time window.

In some cases, as part of fulfilling the request associated with the message, the request processing component may request or instruct application 118 to perform one or more actions. For instance, as described above, request data 108 may indicate that a license for content is requested. In this example, request processing component 120 may request application 118 (or some other logic) to retrieve an appropriate license file for the content. In other cases, request processing component 120 may itself retrieve an appropriate license.

In various embodiments, request processing component 120 may be configured to generate single response message 124 in response to determining that the single request message is valid. Request processing component 120 may generate single response message 124 such that the single response message include response data 126. Response data 126 may include information associated with fulfillment of the request associated with the single request message. For instance, if the request were a request for a content license, response data 126 may include such license. In another example, if the request were a request for permission to perform an action, response data 126 may indicate that permission has been granted. In another example, if the request were a request for a particular portion of data (e.g., one or more files or other portions of data), the response data 126 may include such particular portion of data. In other cases, response data 126 may include other types of data, such as an acknowledgement indication.

To prevent client-side replay attacks, the request processing component includes nonce 110 (e.g., the same nonce that was included within the single request message). On the client side, request generation component may be configured to verify that only one response message including nonce 110 is considered valid. For instance, since request generation component 104 has knowledge of nonce 110 (from the generation of single request message 106), the single request message may compare the nonces of incoming response to ensure that only one message including nonce 110 is considered valid. In this way, if an attacker were to attempt a replay attack on the client (e.g., with a message including nonce 110), the client would detect the replay attack based on the replayed nonce and invalidate the replayed response message.

In some embodiments, the record of received nonces (e.g., record of received nonces 122) may be stored on one or more systems separate from server system 116. Server system 116 may be configured to access the record of received nonces from such systems. In one example, a cluster of server systems (including server systems configured in a manner similar to server system 116) may communicate with one or more clients. For instance, such an embodiment is described below with respect to FIG. 4. In this example, the server systems may access a centralized record of received nonces from one or more centralized systems, such as a database or other data store. In other embodiments, one or more other systems (e.g., a load balancer, such as load balancer 420 described below) may be configured to route all requests from a particular client system (which may be identified by the signature of requests) to a particular server system. In this example, no centralized data store of received nonces may be necessary.

Unsynchronized Time Sources

As described above, various aspects of the system and method for a single request-single response protocol with mutual replay attack protection may include generating (e.g., on the client-side) and evaluating (e.g., on the server-side) the timestamp of a single request message. While request generation component 104 and request processing component 120 may be configured to correctly operate with synchronized (or near synchronized) time sources, the system and method for a single request-single response protocol with mutual replay attack protection may be configured such that synchronization of time sources is not required.

Figure 2:
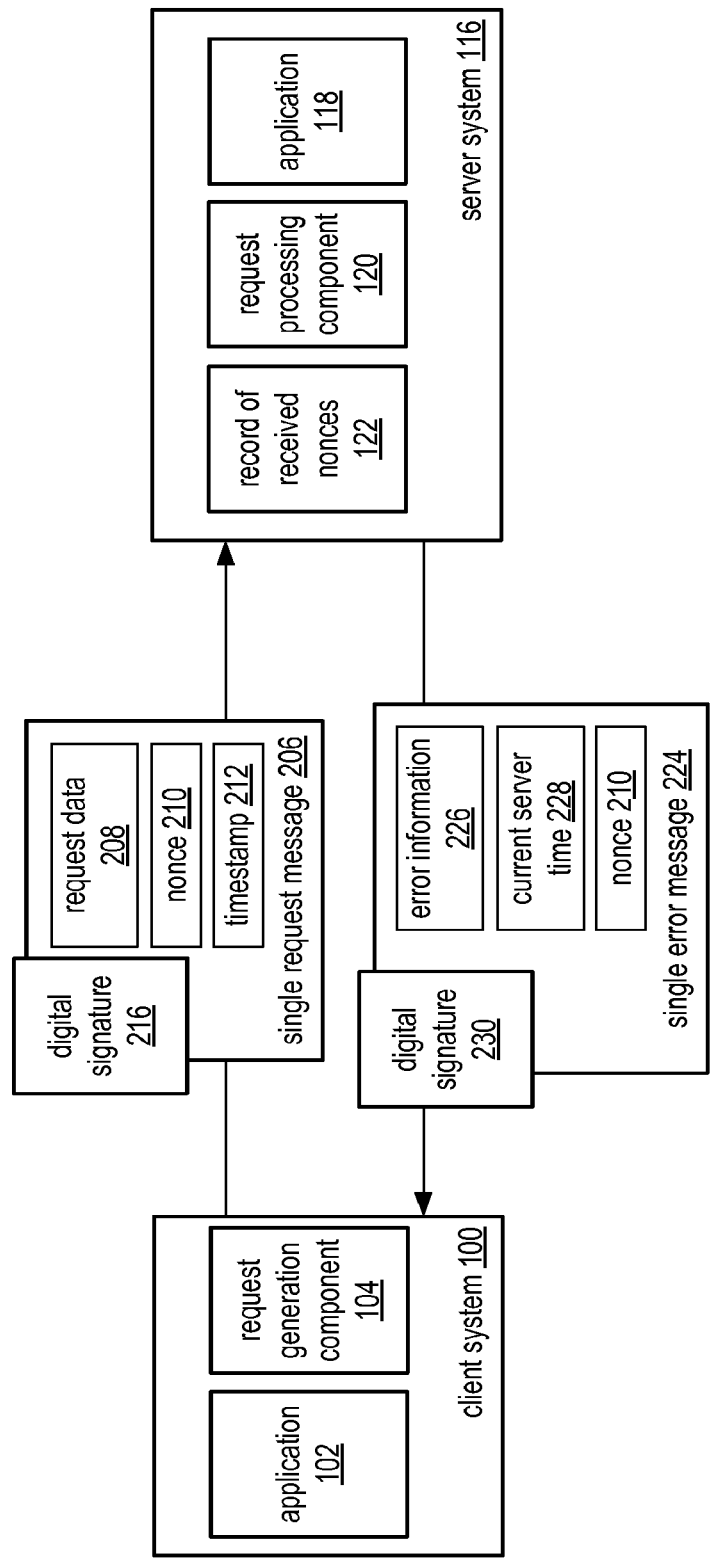
FIG. 2 illustrates a data flow diagram of a process for error handling in a single request-single response protocol with mutual replay attack protection, according to various embodiments.

Referring to FIG. 2, client system 100 may be configured to send a single request message 106 to server system 116 as described above with respect to FIG. 1. Note that similarly labeled and numbered components of single request message 206 may be generated in a manner similar to or the same as that described above with respect to FIG. 1. For instance, single request message 206, request data 208, nonce 210, timestamp 212, and digital signature 216 may each be generated in a manner similar to the generation of single request message 106, request data 108, nonce 110, timestamp 112, and digital signature 116, respectively. In the illustrated embodiment, the time source utilized by request processing component 120 (e.g., an internal component, such as a system clock, or an external component, such as a time server) may be out of sync with respect to the time source utilized by request generation component 104. Similar to the manner described above with respect to FIG. 1, request processing component 120 may evaluate the single request message 206 based on the timestamp generated by request generation component 104. For instance, the request processing component 120 may evaluate the timestamp to determine whether the request has expired (e.g., determine whether the timestamp indicates a time older than the valid period of time described above). In the illustrated embodiment, if the request processing component 120 determines that timestamp 112 indicates a time that falls outside of the valid period of time, the single request message 106 may either be expired or the respective time sources utilized by the request generation component and the request processing component may be out of sync by a quantity of time greater than the valid period of time.

To inform the client of time sources that are out of sync, request processing component may send a single error message 224 to the client system that sent the corresponding request message. Request processing component 120 may generate single error message 224 such that the message includes error information 226, which may specify the type of error (e.g., time synchronization error) that was detected or some other information associated with the error (e.g., an error code that identifies the error). Request processing component 120 may also generate single error message 224 such that the message includes the current server time 228, which may specify the current time of the time source utilized by request processing component 120 and/or the time at which the server system 116 received the associated single request message. Additionally, request processing component 120 may generate single error message 224 such that the message includes nonce 210 (e.g., the same nonce included within single request message 206), which may be utilized by the client system to validate the error message (in a manner similar to that described above with respect to FIG. 1). The request processing component 120 may also digitally sign single error message 224 by generating a digital signature 230 and appending the digital signature to the message. The generation of digital signature 230 may be similar to the generation of digital signature 128 described above (e.g., request processing component 120 may generate the digital signature with a private key).

To address out of sync time sources, request generation component 104 may analyze single error message 224 to determine a time offset value to add to time values obtained from its associated time source in order to generate timestamps for subsequent single request messages. The request generation component may determine the time offset value based on timestamp 112 sent in message 106 and the current server time 228 received in the single error message 224. For example, the request generation component 104 may determine the time offset value as being the result of subtracting the time value indicated by timestamp 112 from current server time 228. For each subsequent single request message sent between client system 100 and server system 116, request generation component 104 may add the time offset value to the current time as determined from its associated time source. For each subsequent message sent from client system 100 to server system 116, the request generation component 104 may generate the timestamp of subsequent single request messages as being the result of that summation in various embodiments. For instance, subsequent single requests may be generated in a manner similar to that described above with respect to FIG. 1 by modifying timestamp 112 by adding the aforesaid time offset value to the current time indicated by the timestamp.

By adding the time offset value to timestamps, such as timestamp 112, various embodiments may prevent request processing system 120 from determining that legitimate single request messages are expired due to unsynchronized time sources. Note that the data flow illustrated in FIG. 2 may conform to the single request-single response protocol since the single request message 206 and single error message 224 form a single session. Single request messages sent after the single error message 224 (e.g., after request generation component implements the use of the time offset value) may each be separate sessions with distinct nonces.

Example Method(s)

Various embodiments of the system and method for a single request-single response protocol with mutual replay attack protection may include various methods. One example of such a method is illustrated in by the flowchart of FIG. 3. In various embodiments, various portions of the method may be performed by client and server computer systems, such as client system 100 and server system 116. As illustrated by block 300, the method may include a client system (or simply "client") (e.g., client system 100) generating a single request message and sending the single request message to a server system (or simply "server") (e.g., server system 116). In various embodiments, the composition of the single request message may be similar to that of single request message 106 described above. For instance, the method may include generating the single request message such that the request message includes request data (e.g., request data 108). Request data may include data describing or identifying the request. For instance, the method may include generating the request data such that it includes data identifying content for which a license is requested, data specifying one or more actions for which a client application seeks permission to perform, data including information about the client system and/or a client application that is submitting the request (e.g., host addresses or application identifier), and/or data including information for identifying or authenticating a user utilizing a client application on the client (e.g., a username and/or password).

The method may also include the client generating the single request message such that the request message includes a nonce, such as nonce 110 described above. In some embodiments, the method may include the client generating the nonce such that the nonce represents a session identifier that may be used only once per session. In various embodiments, the method may include the client generating the nonce in a random or pseudo-random fashion. In some cases, the nonce generated may be a cryptographic nonce (e.g., a nonce generated with a cryptographic hash function).

The method may also include generating the single request message such that it includes a timestamp (e.g., timestamp 112 described above). In various embodiments, the method may include the client generating the single request message such that the timestamp indicates a time at which the single request message was generated.

In various embodiments, the method may include the client digitally signing the request before sending it to the server computer system (or simply "server") (e.g., server system 116). For instance, the method may include the client digitally signing the single request message by appending a digital signature to the single request message (e.g., as metadata). In one example, the method may include the client digitally signing the single request message in a manner similar to that described above with respect to the generation of digital signature 112 (e.g., hashing the single request message and asymmetrically encrypting the hash value with the client's private key to generate the digital signature).

As illustrated by block 302, the method may include the server receiving the single request message. For instance, the single request message may be sent by the client over one or more data networks (e.g., the Internet or other electronic communication networks); receiving the single request message may include the server receiving the single request message via such data networks.

As illustrated by block 304, the method may include the server determining whether the digital signature of the single request message is valid. For example, the server may verify the digital signature against a public key for the client system. For instance, in a manner similar to that described above for verifying digital signature 112, the method may include generating a hash of the single request message, decrypting the digital signature of the single request message with the client's public key, and determining that the digital signature is valid if the hash and the decryption result are equivalent or determining that the digital signature is invalid if the hash and the decryption result are not equivalent. If it is determined that the digital signature is invalid, the method may include the server discarding the single request message or sending an appropriate error message to the client, as illustrated by block 322.

As illustrated by block 306, if the digital signature is valid, the method may include the server determining whether the timestamp of the single request message indicates a time within a valid period of time from the current time. In one example, a valid time period might include a range of time extending from particular time before the current time up to the current time (e.g., the last 5 minutes or some other time window). By ensuring that the timestamp of the single request message indicates a time that falls within the valid period of time, the method may in some cases prevent replay attacks where an attacker tries to submit a replayed message at some time in the future. If the timestamp does not fall within the valid period of time, the method may proceed to block 316, which is described in more detail further below.

As illustrated by block 308, if the timestamp indicates a time that falls within the valid period of time, the method may include the server determining whether the nonce of the single request message is present within a record of previously received nonces. One example of such a record includes the record of previously received nonces 112, which is described in more detail above. If the nonce is determined to already be present within the record of previously received nonces, the server may discard the single request message or send an appropriate error message to the client, as illustrated by bock 322. By operating in this manner, the method may ensure that replayed messages are determined to be invalid (e.g., since replayed messages may include replayed nonces).

As illustrated by block 310, if it is determined that the nonce from the single request message is not present with the record of received previously received nonces, the method may include the server determining that the single request message is a valid single request message and storing the nonce from the single request message within the record of received nonces. In this way, the method may prevent a replay attack that submits a message including the same nonce at a time falling within the valid time window.

As illustrated by block 312, the method may further include the server generating a single response message (e.g., in response to determining that the single request message is valid). One example of such a response message is described above with respect to single response message 124. For instance, the method may include the server generating the single response message such that the single response message includes response data (e.g., response data 126). Response data may include information associated with fulfillment of the request associated with the single request message, such as a content license, information indicating permission to perform an action, and/or a particular portion of requested data.

As illustrated by block 314, the method may include the client validating the single response message. For instance, the method may include the client verifying that only one response message including the nonce (of the original request) is considered valid. For example, since the client may have knowledge of the original nonce from the generation of the single request message described with respect to block 300, the method may include the client comparing the nonce of the incoming request response to ensure that only one message including original nonce is considered valid. In this way, if an attacker were to attempt a replay attack on the client, the illustrated method would include the client detecting the replay attack based on the replayed nonce and invalidating the replayed response message.

As described above with respect to block 306, the method may in some cases include determining that the timestamp of the single request message does not fall within the valid period of time. In some cases, this characteristic of a single request message may be caused by unsynchronized time sources of the client and server (such as described above with respect to FIG. 2). In these cases, as illustrated by block 316, the method may include the server sending to the client a single error message that includes the server's current time. For instance, the method may include the server obtaining its current time from a system clock and embedding that time in the single error message sent to the client. As illustrated by block 318, the method may include the client determining a time offset value to address out of sync time sources. For example, the method may include the client determining the time offset value based on the timestamp of the single request message originally sent by the client and the current server time from the error message. For instance, the method may include determining the time offset value as being the result of subtracting the time value indicated by the timestamp of the single request message originally sent by the client from the current server time from the error message. As illustrated by block 320, the method may include the client sending a new single request message that includes a corrected timestamp (e.g., the sum of the current time as obtained from a time source and the determined time offset value) and a newly generated nonce. By adding the time offset value to timestamps, various embodiments of the method may prevent the receiving server from determining that legitimate single request messages are expired due to unsynchronized time sources. Note that the newly generated single request message may be sent to the server as part of a new session.

Example System Configuration

Figure 4:
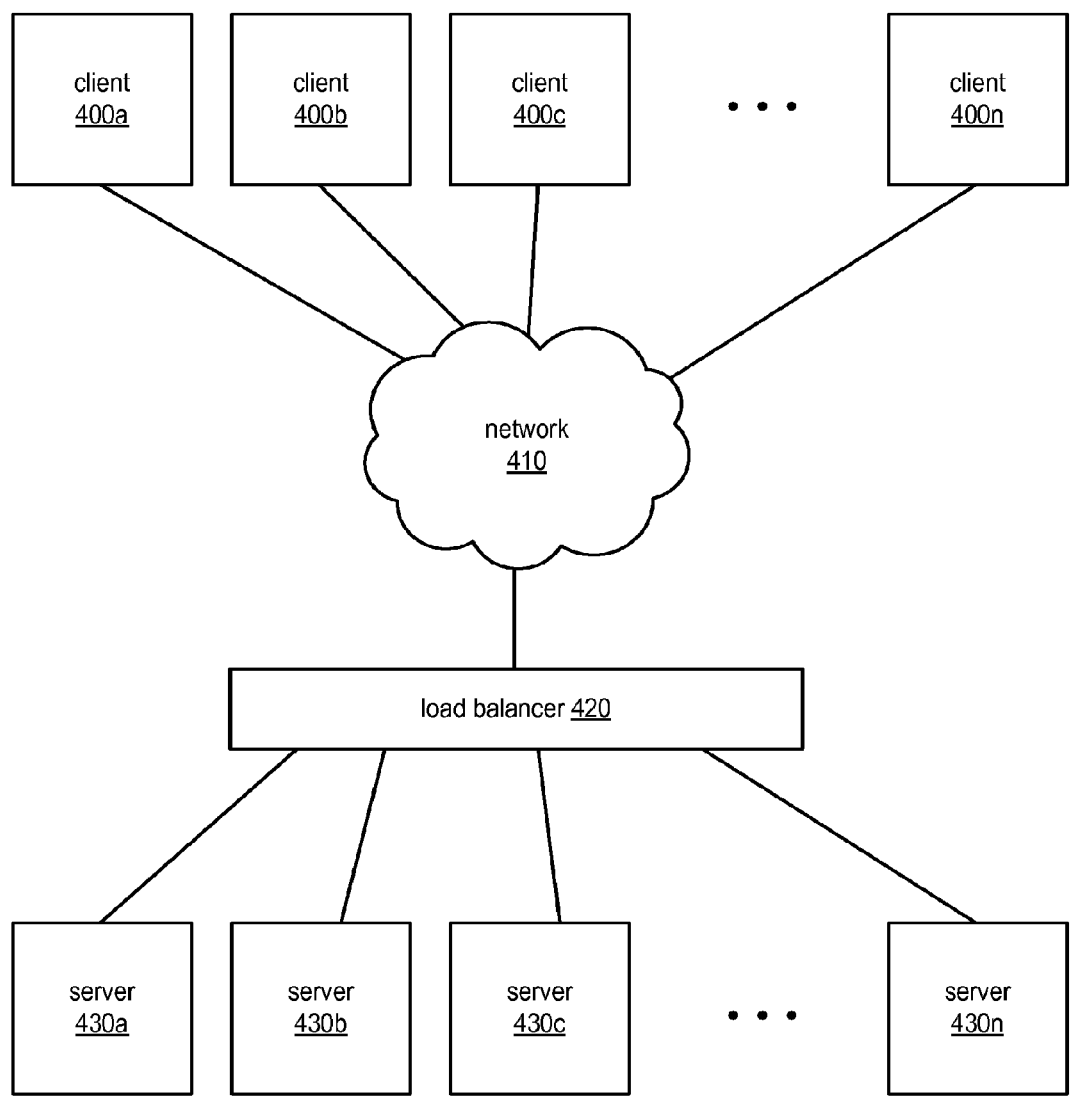
FIG. 4 illustrates a block diagram of one example of a system configuration, according to various embodiments.

FIG. 4 illustrates one example system configuration according to some embodiments of the system and method for a single request-single response protocol with mutual replay attack protection. In the illustrated embodiment, each of the clients 400a-n (collectively referred to as clients 400) may be configured in a manner similar to that of client system 100 described above. Similarly, each of servers 430a-n (collectively referred to as servers 430) may be configured in a manner similar to that of server system 116 described above. Each of clients 400 may communicate with any of servers 430 (and vice-versa) via network 410. For instance, ones of clients 400 may send single request messages to ones of servers 430. In response to such single request messages, ones of servers 430 may send single response messages (or single error messages) to ones of clients 400.

In some embodiments, the system may include a load balancer 420 configured to operate with the goal of evenly (or nearly evenly) distributing requests from clients 400 to servers 430. (Note that in other embodiments a load balancer is optional). Since the clients 400 and servers 430 are configured to operate according to a single request-single response protocol, load balancer 420 may in many embodiments be relieved of maintaining transaction states. For instance, in conventional systems that employ challenge/response protocols, load balancers may be required to maintain state information for transactions in order to route multiple transaction messages from a particular client to the same server that is tasked with consuming such messages. In various embodiments, load balancer 420 may not maintain such state information. Instead, since in various embodiments a given session includes only one communication from a client to a server (e.g., a single request message), load balancer 420 is not required to maintain state information (e.g., as is the case with other systems that employ challenge/response protocols).

Example System

Various embodiments of a system and method for a single request-single response protocol with mutual replay attack protection, as described herein, may be executed on one or more computer systems, which may interact with various other devices. One such computer system is computer system 500 illustrated by FIG. 5, which may in various embodiments implement any of the elements illustrated in FIGS. 1-4 (e.g., client system 100, server system 116, etc.). Computer system 500 may be capable of implementing a request generation component, such as request generation component 104, or a request processing component, such as request processing component 120, either of which may be stored in memory 520 as processor-executable program instructions 522. In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In some embodiments, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x56, PowerPC, SPARC, or MIPS ISAs, or any other suitable ISA. In multiprocessor systems, each of processors 510 may commonly, but not necessarily, implement the same ISA.

System memory 520 may be configured to store program instructions 522 and/or data 532 accessible by processor 510. In various embodiments, data 532 may store one or more of single request messages, single response messages, single error messages and a record of received nonces, such as those described above. In various embodiments, system memory 520 may be implemented using any suitable memory technology, such as static random access memory (SRAM), synchronous dynamic RAM (SDRAM), nonvolatile/Flash-type memory, or any other type of memory. In various embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 500), such as other computer systems, or between nodes of computer system 500. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

Those skilled in the art will appreciate that computer system 500 is merely illustrative and is not intended to limit the scope of the present invention. In particular, the computer system and devices may include any combination of hardware or software that can perform the indicated functions, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage devices while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include a storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure. Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of the invention as defined in the claims that follow.

What is claimed is:

1. A computer-implemented method, comprising:
receiving, at a server system, a request message comprising a nonce, a timestamp based on a time at which the request message was generated, and a digital signature of the request message;
accessing a record of previously received nonces;
modifying the record to remove one or more of the previously received nonces corresponding to messages that were received outside of a valid period of time; and
validating the request message by at least verifying the digital signature of the request message, determining that the timestamp of the request message is within the valid period of time, and determining that the nonce of the request message is not included in the modified record of previously received nonces.

2. The computer-implemented method of claim 1, further comprising, in response to validating the request message, storing the nonce of the request message in the modified record of previously received nonces.

3. The computer-implemented method of claim 1, further comprising, in response to validating the request message, sending a response comprising the nonce of the request message and information associated with fulfillment of a request included in the request message.

4. The computer-implemented method of claim 1, wherein verifying the digital signature of the request message comprises verifying the digital signature against a digital certificate.

5. The computer-implemented method of claim 4, wherein the digital certificate comprises a public key associated with a client system that generated the digital signature.

6. The computer-implemented method of claim 1, further comprising, in an event that the request message is not validated, sending an error message to a client device that generated the request message.

7. The computer-implemented method of claim 6, wherein the error message is based on the timestamp being outside of the valid period of time, wherein the valid period of time comprises a rolling window of time with respect to the current time, and wherein the error message includes a current server time.

8. A computer-implemented method, comprising:
generating, by a computing device, a request message including a nonce, a timestamp indicating a time at which the request message is generated, and a digital signature of the request message;
sending the request message to a server system configured to validate the request message based on whether the signature is valid, the timestamp is within a valid period of time prior to a current time at which the request message is received at the server system, and the nonce is not included in a record of nonces previously sent to the server system, the record being modifiable to remove one or more of the nonces that were sent to the server system outside of the valid period of time; and
receiving a response message including the nonce and information associated with fulfillment of a requested action included in the request message.

9. A method of claim 8, further comprising:
receiving an error message from the server system based on the timestamp being outside the valid period of time, the error message including a current server time; and
determining a time offset value by using the current server time in the error message and the timestamp in the request message.

10. A method of claim 9, further comprising generating a new timestamp for one or more subsequent messages sent to the server system, the new timestamp comprising a summation of the time offset value and a time that is current when the one or more subsequent messages are generated.

11. A method of claim 8 further comprising verifying that only one response message including the nonce is valid.

12. A method of claim 8, further comprising verifying that the nonce included in the response message matches the nonce in the request message.

13. A system, comprising:
a message processing component implemented at least in part by hardware, the message processing component configured to:
receive a request message comprising a nonce, a timestamp based on a time at which the request message was generated, and a digital signature of the request message;
access a record of previously received nonces;
modify the record to remove one or more of the previously received nonces corresponding to messages that were received outside of a valid period of time; and
validate the request message by at least verifying the digital signature of the request message, determining that the timestamp of the request message indicates a time that is within the valid period of time, and determining that the nonce of the request message is not included in the modified record of previously received nonces.

14. The system of claim 13, wherein the message processing component is further configured to, in response to validation of the request message, store the nonce of the request message in the modified record of previously received nonces.

15. The system of claim 13, wherein the message processing component is further configured to, in response to validation of the request message, send a response comprising the nonce of the request message and information associated with fulfillment of a request included in the request message.

16. The system of claim 13, wherein the message processing component is further configured to verify the digital signature against a digital certificate.

17. The system of claim 16, wherein the digital certificate comprises a public key associated with a client system that generated the digital signature.

18. The system of claim 13, wherein the message processing component is further configured to, in an event that that request message is not validated, send an error message to a client device that generated the request message.

19. The system of claim 18, wherein the error message is based on the timestamp being outside of the valid period of time, and wherein the error message includes a current server time.

20. The system of claim 18, wherein the valid period of time comprises a rolling window of time with respect to the current time.

* * * * *